United States Patent [19]
Sampica et al.

[11] Patent Number: 5,592,288
[45] Date of Patent: Jan. 7, 1997

[54] METHOD AND APPARATUS FOR PRE-ASSEMBLING OPTICAL COMPONENTS FOR USE WITH LIQUID CRYSTAL DISPLAYS

[75] Inventors: James D. Sampica, Cedar Rapids; Melvin L. Campbell, Marion; Donald L. Benn, Cedar Rapids; Brian K. Smith, Marion, all of Iowa

[73] Assignee: Rockwell International Corp., Seal Beach, Calif.

[21] Appl. No.: 430,966

[22] Filed: Apr. 28, 1995

[51] Int. Cl.$^6$ .................................................. G02F 1/1335
[52] U.S. Cl. ...................... 356/62; 156/104; 156/106; 156/285; 156/286; 156/382; 349/153
[58] Field of Search ...................... 156/285, 286, 156/291, 308.4, 381, 382, 99, 104, 297, 102; 359/566, 62, 63, 74, 80, 900

[56] References Cited

U.S. PATENT DOCUMENTS

| | | | |
|---|---|---|---|
| 4,387,133 | 7/1983 | Ichikawa et al. | 359/74 |
| 4,637,850 | 1/1987 | Suzuki et al. | 156/60 |
| 5,106,441 | 4/1992 | Brosig | 156/104 |
| 5,208,080 | 5/1993 | Gajewski et al. | 359/62 |
| 5,329,391 | 7/1994 | Miyamoto et al. | 359/62 |
| 5,365,356 | 11/1994 | McFadden | 359/80 |
| 5,371,619 | 12/1994 | Sirkin et al. | 359/74 |

*Primary Examiner*—William L. Sikes
*Assistant Examiner*—Kenneth Parker
*Attorney, Agent, or Firm*—Gregory G. Williams; M. Lee Murrah; G. A. Montanye

[57] ABSTRACT

An optical component assembly is created with reduced defects in the adhesion and alignment between the optical components. A first rigid optical component is placed into a cavity. A second rigid optical component is placed into the cavity such that it is supported by a first support device which prevents a first end of the second rigid optical component from contacting a corresponding first end of the first rigid optical component. Air is evacuated from a chamber formed between the first and second rigid optical components. The support of the first support device is removed so that the first end of the second rigid optical component comes into contact with the first end of the first rigid optical component with a layer of adhesive material sandwiched therebetween. A force is applied to urge surfaces of the first and second rigid optical components toward one another to improve adhesion between the two.

11 Claims, 10 Drawing Sheets

METHOD AND APPARATUS FOR PRE-ASSEMBLING OPTICAL COMPONENTS FOR USE WITH LIQUID CRYSTAL DISPLAYS

BACKGROUND OF THE INVENTION

The present invention relates generally to liquid crystal displays, and more particularly, to a method and apparatus for pre-assembling optical components for use with a liquid crystal display.

Assembling various optical components typically associated with liquid crystal displays (LCDs) requires a process which is essentially defect free, resulting in high yields. The various optical components used in conjunction with LCDs include both rigid optical components and flexible optical components. Rigid optical components can be, for example, glass plates, diffusers, compensators and heaters. Flexible optical components can be films such as polarizers, retarders, and dry film adhesives. The high costs of LCDs and these related optical components makes it very important to eliminate or greatly reduce waste. Further, defects in the assembly process can significantly effect the performance of an LCD.

A common defect which manifests itself during assembly of LCD optical component stack-ups is misalignment between optical axes of various components. For example, the absorption axis of a polarizer material must be aligned, within a very low tolerance, with the rub axis on the LCD substrate. To obtain the contrast necessary for avionics displays, the total misalignment must be no greater than 1 degree. Current assembly techniques result in misalignment in excess of 2 degrees, and as such, are inadequate for achieving the necessary alignment tolerances.

A number of assembly techniques exist in the prior art. Each of these techniques introduces one or more defects into the LCD stack-up. These defects include strain on the LCD, loss of adhesion between optical components, bubbles formed between optical components, stress fractures occurring in the adhesive materials, discoloration of the adhesive materials, high reflectance due to poor index matching of the adhesive material to the optical components, and birefringence of the adhesive materials causing undesirable effects in the display output such as Newton rings and loss of contrast. Consequently, there is a need for a low cost assembly process which eliminates these defects to provide a high yield of optical component assemblies which exhibit stability through environmental testing under extreme conditions of temperature, humidity and vibration.

SUMMARY OF THE INVENTION

It is an object of the present invention to provide a high yield process of assembling optical components for use with LCDs. It is a second object of the present invention to provide a process of assembling optical components with improved alignment between the optical components. It is a third object of the present invention to provide a process of assembling optical components which improves the reliability of the adhesion between optical components by eliminating the defects discussed in the background section of the present application. It is a fourth object of the present invention to provide a method of and apparatus for combining optical components into an optical component assembly for subsequent attachment to the LCD. The present invention achieves these objects and others discussed throughout this application.

According to the present invention, an optical component assembly is created with reduced defects in the adhesion and alignment between the optical components. A first rigid optical component is placed into a cavity. A second rigid optical component is placed into the cavity such that it is supported by a first support device which prevents a first end of the second rigid optical component from contacting a corresponding first end of the first rigid optical component. Air is evacuated from a chamber formed between the first and second rigid optical components. The support of the first support device is removed so that the first end of the second rigid optical component comes into contact with the first end of the first rigid optical component except with a layer of adhesive material sandwiched therebetween. A force is applied to urge surfaces of the first and second rigid optical components toward one another to improve adhesion between the two, thereby physically and optically coupling the two.

BRIEF DESCRIPTION OF THE DRAWINGS

The invention may be more fully understood by reading the following description of preferred embodiments of the invention in conjunction with the appended drawings wherein.

DETAILED DESCRIPTION OF THE PREFERRED EMBODIMENTS

The present invention is a method of and apparatus for pre-assembling optical components to create optical component assemblies for subsequent attachment to an LCD. A method of and adhesive material for attaching optical components and optical component assemblies to an LCD is detailed in co-pending and commonly assigned U.S. Patent Application File No. 95CR032 filed on even date herewith and which is herein incorporated by reference. Pre-assembling the optical components in the manner provided by the present invention eliminates defects which frequently occur in conventional fabrication methods which involve the sequential attachment of each optical component directly to the LCD or LCD stack-up. Also, pre-assembling the components protects the LCD from damage which can occur when unnecessarily exposed to the extreme pressures and temperatures which are desirable to use in the assembly of optical components.

Figure 1:
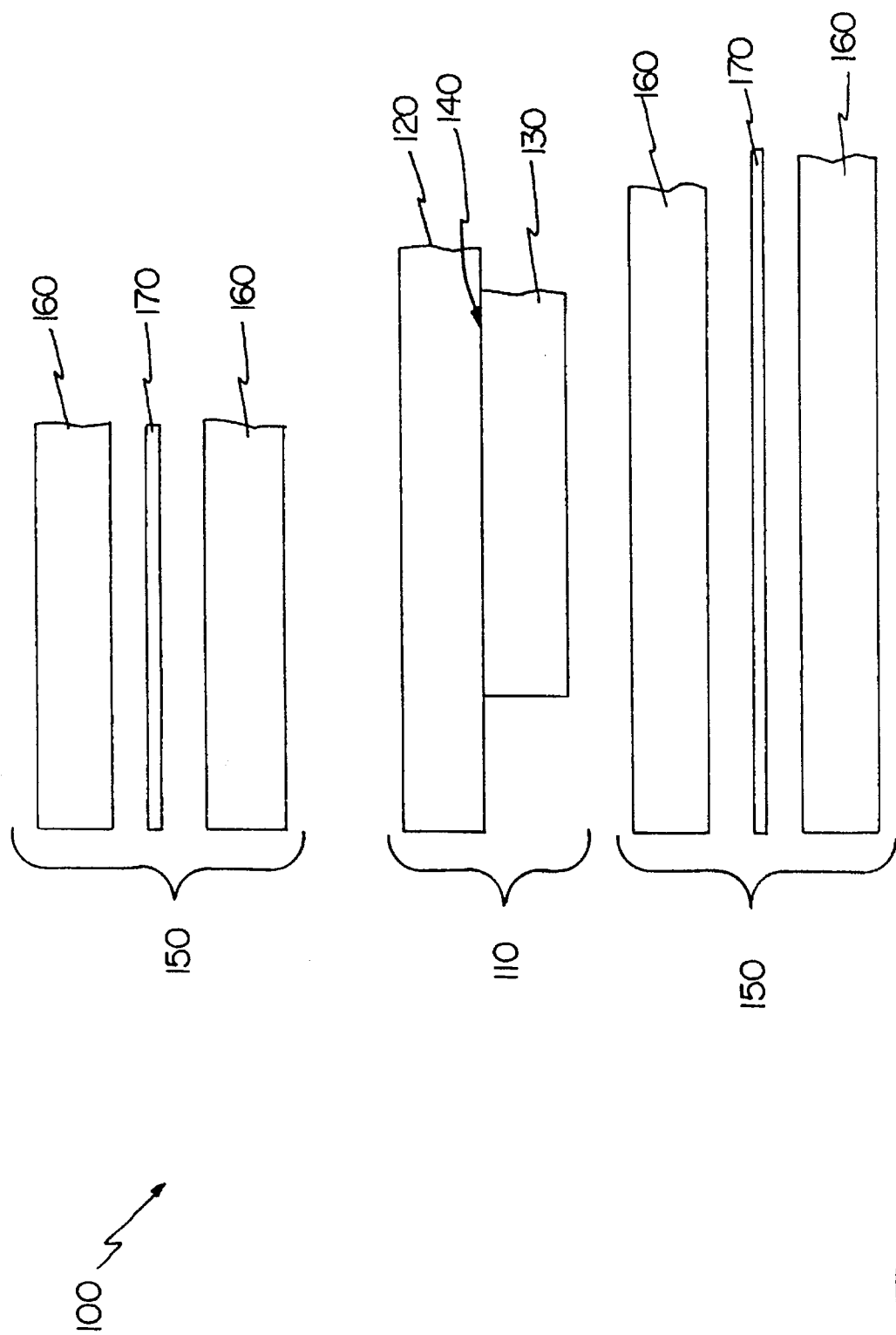
FIG. 1 is a diagrammatic side view of an LCD and optical component stack-up having optical component sub-assemblies in accordance with preferred embodiments of the present invention.

FIG. 1 is a diagrammatic view of an LCD and optical component stack-up having optical component sub-assemblies assembled in accordance with preferred embodiments of the present invention. LCD stack-up 100 includes LCD 110 and one or more optical component assemblies 150. LCD 110 includes glass substrate 120, glass color filter 130 and layer of liquid crystal (LC) material 140 positioned between substrate 120 and filter 130.

In the embodiment illustrated in FIG. 1, optical component assemblies 150 each include two rigid optical elements or components 160 and one flexible optical element or component 170. However, it should be understood that the method of the present invention of pre-assembling optical components to obtain optical component assemblies for use with LCDs is not limited to optical component assemblies having this combination of rigid and flexible optical components. In general, the present invention covers methods of pre-assembling optical components to create optical component assemblies both by applying flexible optical films to rigid optical components and by adhering one rigid optical component or sub-assembly to another rigid optical component or sub-assembly.

Rigid optical components 160 can be any optical component having a rigid substrate or other surface. The rigid substrate or surface is preferably glass. Rigid optical components 160 are typically optical films deposited on a glass substrate. Examples of rigid optical components 160 include compensators, glass with antireflective (AR) coating, and heaters. In some preferred embodiments of the present invention, rigid optical components are components such as plain glass plates used to create optical component assemblies for subsequent adhesion to LCD 110. Flexible optical components 170 can be any optical film component for use with an LCD. Examples of flexible optical components include polarizers, retarder films and dry film adhesives.

Figure 2:
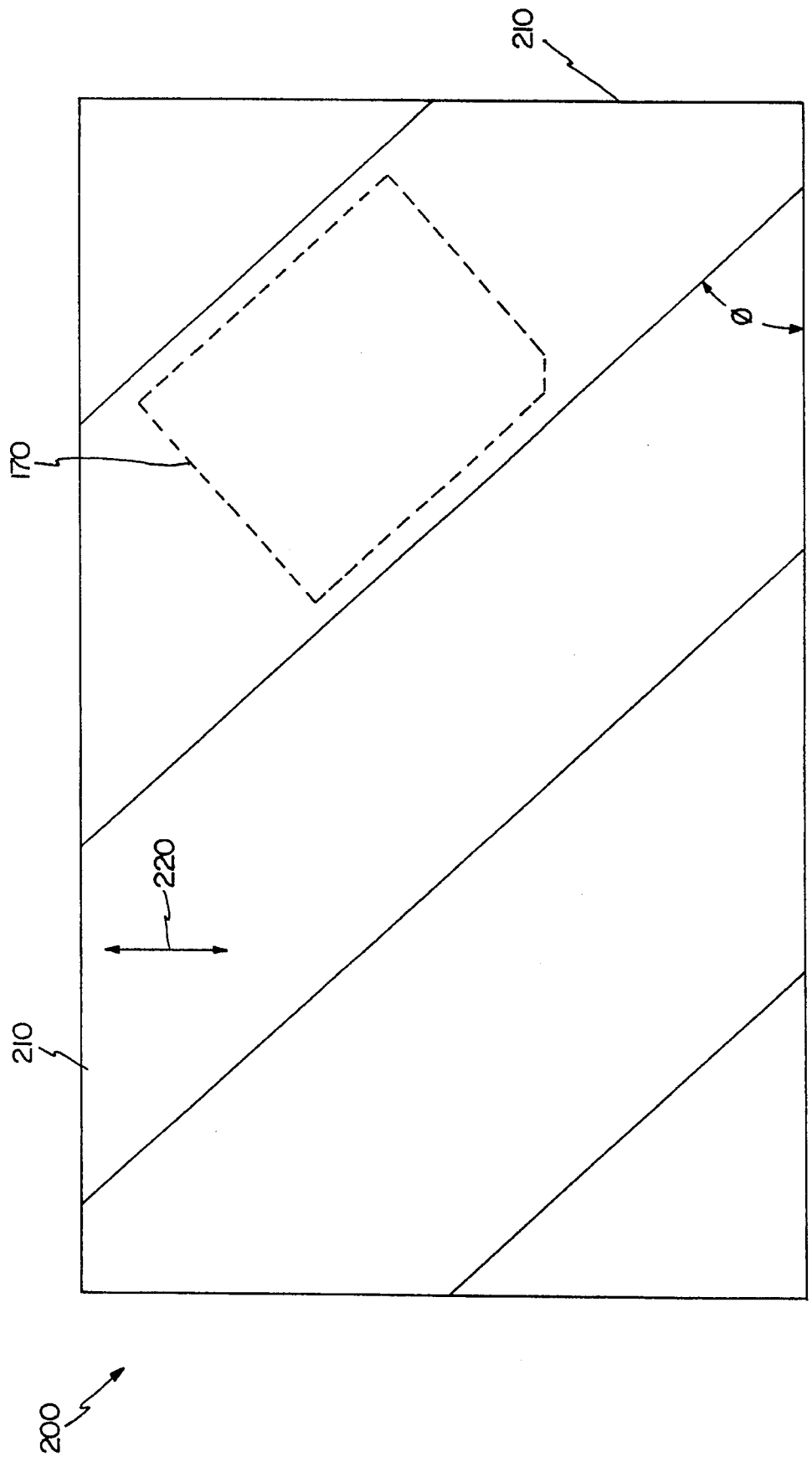
FIG. 2 is a top view of a portion of a flexible sheet of flexible optical component film cut in accordance with preferred embodiments of the present invention.

FIG. 2 is a top view of a portion of sheet 200 of flexible optical film material used to create flexible optical components 170. Sheet 200 is generally a sheet of flexible optical film material, such as polarizer film material, widely available on the market. Sheet 200 is cut into strips 210 at angles φ relative to an edge of the film. Strips 210 are cut at angles φ to achieve the proper orientation (denoted by arrow 220) of an optical axis or other characteristic of the film, as is required to achieve proper interaction of components in LCD stack-up 100.

As can be seen by the length and width of each of strips 210 as compared to the size of flexible optical components 170 (represented in FIG. 2 by dashed lines), strips 210 are each substantially larger than what is needed to create one of components 170. This is due to several factors. First, by cutting sheet 200 into strips 210 which are larger than needed, each strip can be applied to one of rigid optical components 160 in an overlapping fashion and can subsequently be trimmed back. This insures complete coverage of the rigid optical component with the flexible optical component—a significant problem with prior art methods. Second, by making strips 210 longer than necessary, misalignment between rigid optical component 160 and flexible optical component 170 due to rotation of the flexible optical component can be minimized and easily measured. This is due to the fact that, for a given misalignment at the ends of a strip 210, rotational misalignment near the center of the strip will be less if the ends of the strip are farther away from the center.

Figure 3:
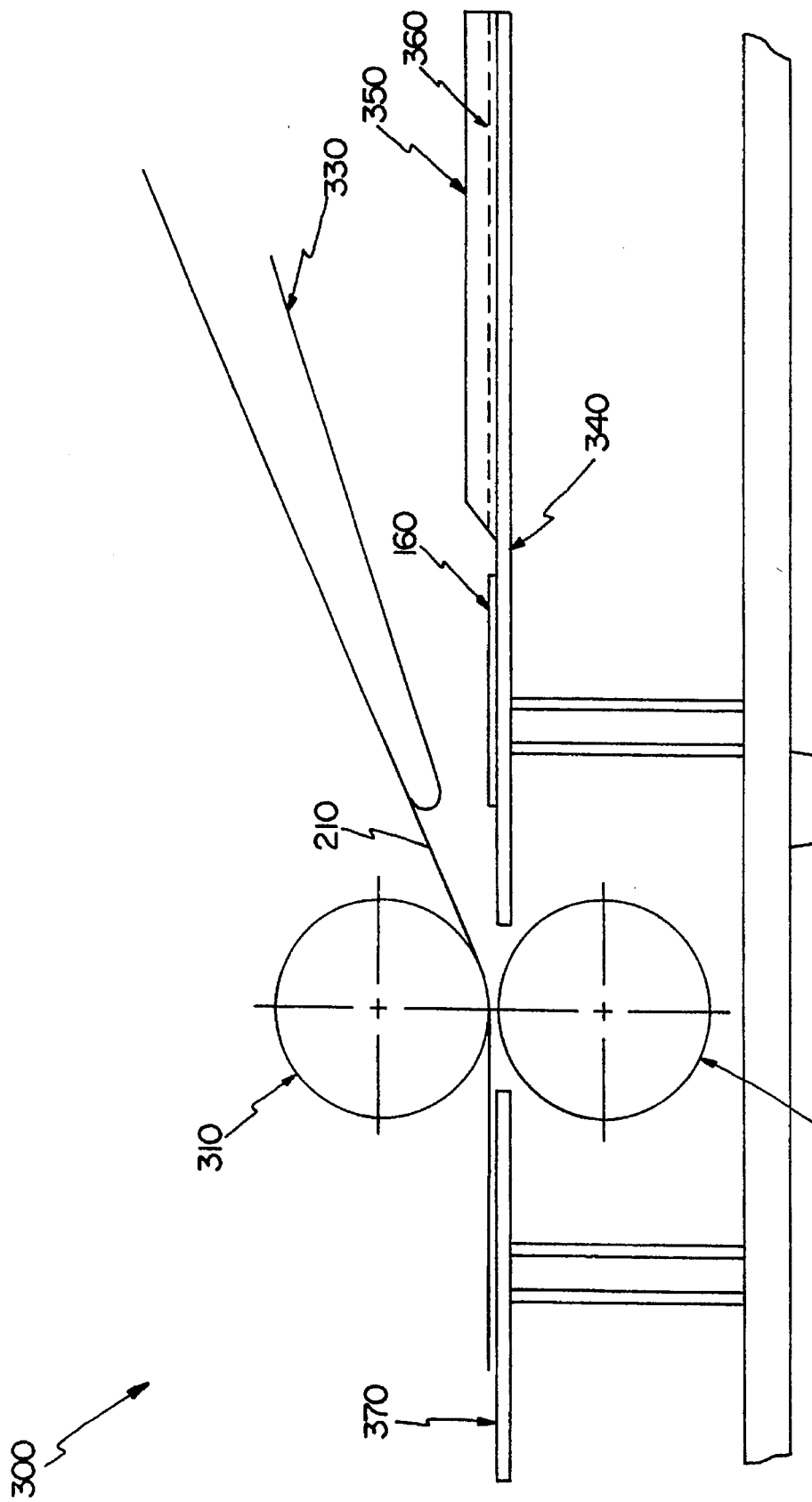
FIG. 3 is a diagrammatic side view of an apparatus according to the present invention for applying a flexible optical component film to a second optical component having a rigid substrate.
Figure 4:
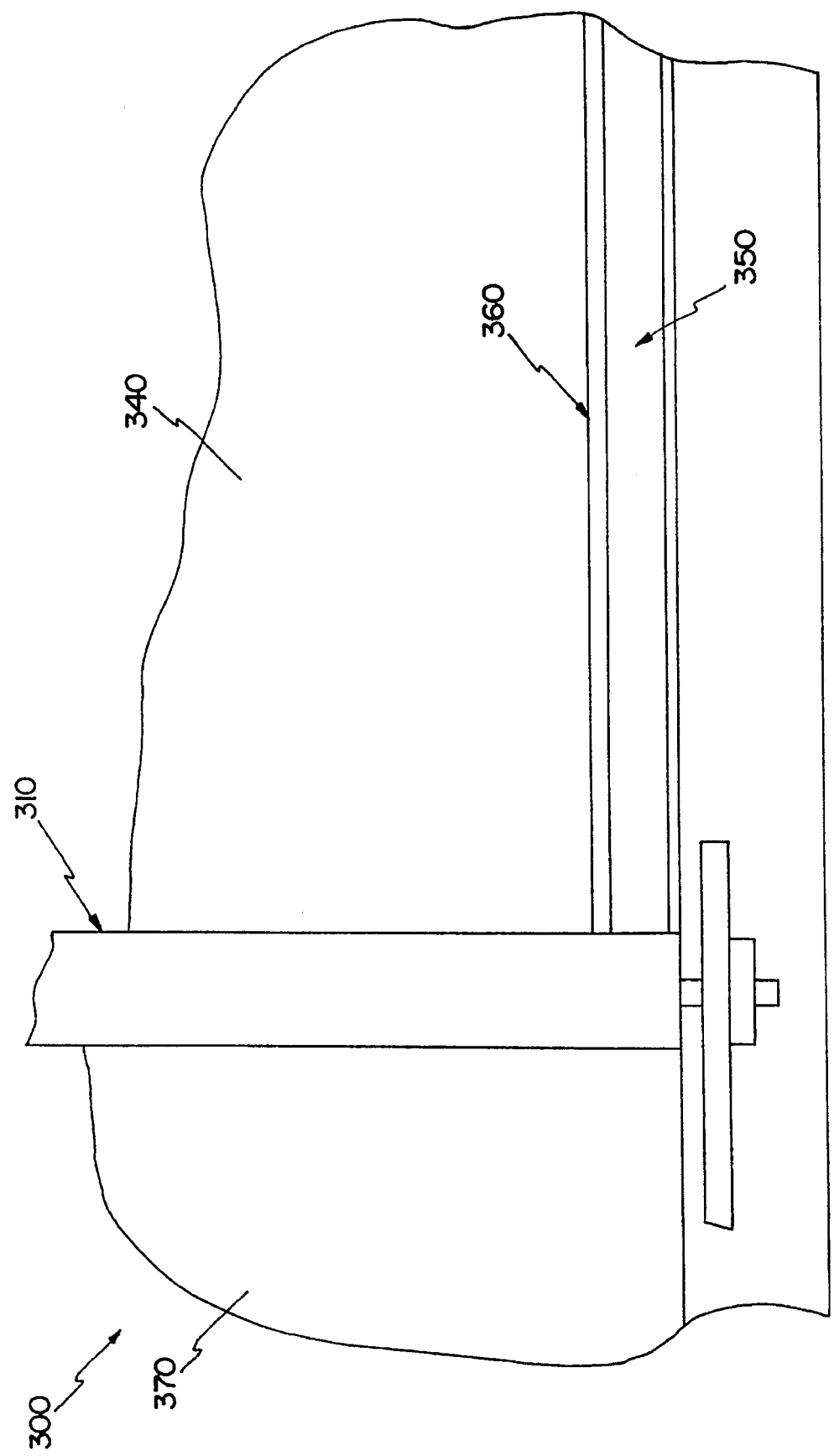
FIG. 4 is a diagrammatic top view with portions broken away of the apparatus shown in FIG. 3.

FIGS. 3 and 4 illustrate an apparatus according to the present invention for applying strips 210 of the flexible optical film to rigid optical components 160 or to component sub-assemblies having solid substrates. Roller apparatus 300 includes first roller 31 0, second roller 320, in-feed table 340 having edge guide 350 and step 360, and out-feed table 370. First roller 310 is preferably an aluminum roller, while second roller 320 is preferably a rubber roller. This combination allows for more uniform pressure to be applied along the edges of the solid substrate and flexible film interface.

Strip 210 of flexible optical film has layers of pressure sensitive adhesive on one or both sides. The pressure sensitive adhesive can be any of a number of pressure sensitive adhesives available on the market. In at least one preferred embodiment, the pressure sensitive adhesive is believed to be a modified acrylic adhesive. Protective films 330 cover the one or two layers of pressure sensitive adhesive. Strip 210 is fed through rollers 310 and 320, where it is applied to rigid optical component 160. Prior to reaching rollers 310 and 320, protective film 330 is removed from the side of strip 210 which is to be applied to rigid optical component 160.

Rigid optical component 160 is supported by in-feed table 340 as it is guided toward rollers 310 and 320. Edgeguide 350 and step 360 keep rigid optical component 160 a predetermined distance from the edge of in-feed table 340 so that, as rigid optical component 160 is fed through rollers 310 and 320, strip 210 overlaps its sides. Thus, since strip 210 overlaps the sides of rigid optical component 160, complete coverage is ensured. In preferred embodiments, edgeguide 350 and step 360 extend as far toward rollers 310 and 320 as necessary to keep rigid optical component 160 the predetermined distance from the edge at the point that optical component 160 has strip 210 applied. Out-feed table 370 supports the new optical component sub-assembly created by the attachment of component 160 to component 170 with the pressure sensitive adhesive.

Figure 5:
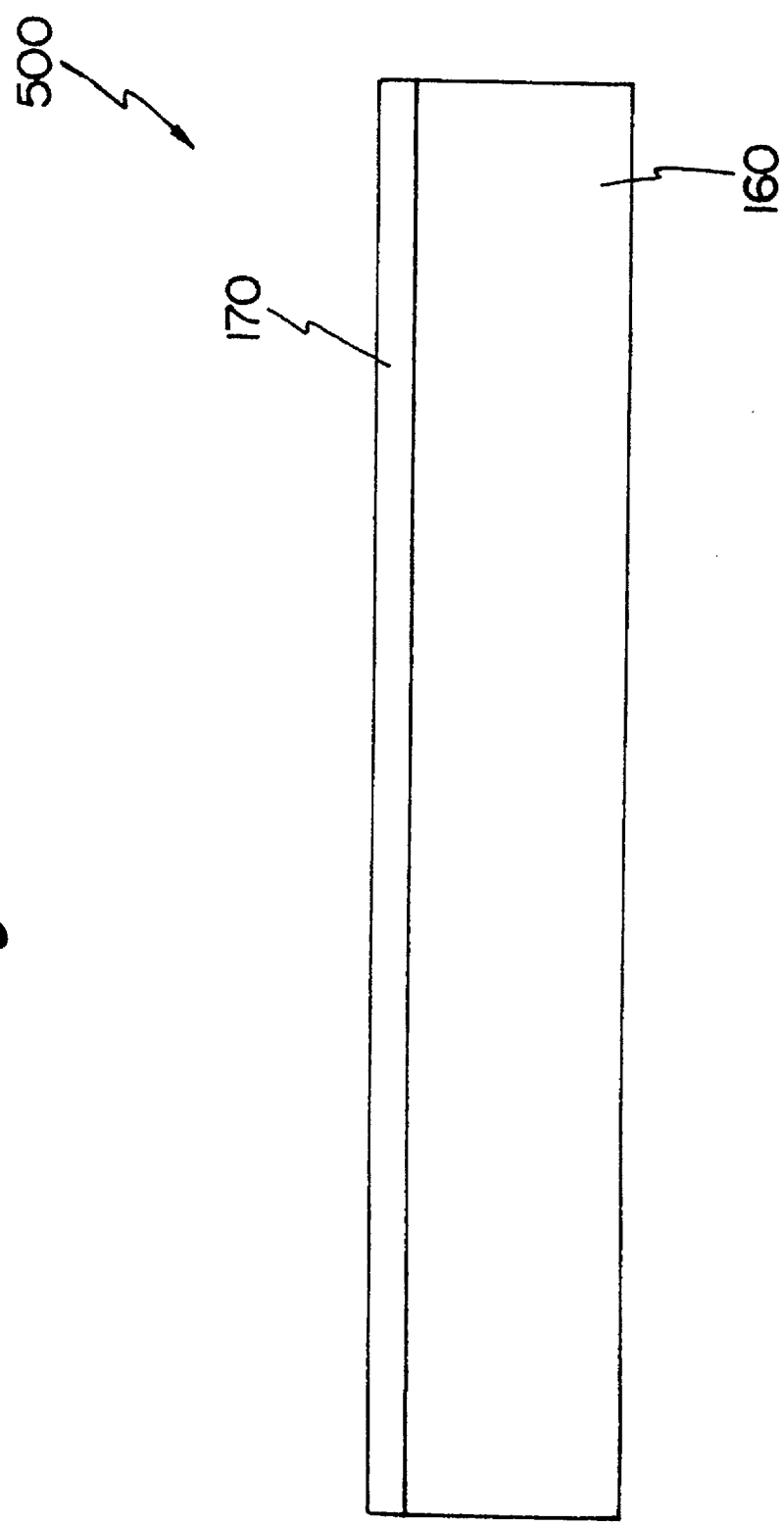
FIG. 5 is a side view of an optical component sub-assembly produced by applying a flexible optical component film to an optical component having a rigid substrate in accordance with preferred embodiments of the present invention.

As shown in FIG. 5, optical component sub-assembly 500 has flexible optical component 170 joined to rigid optical component 160. The optical mismatch can be measured at this point. The overlapping portions of the flexible optical film are trimmed off so that flexible optical component 170 is essentially the same size as, and totally covers, rigid optical component 160. Because of the sensitivity of LCD 110 (FIG. 1), rigid optical component 160 preferably does not contain a liquid crystal. However, in general, any rigid glass plate or substrate material can be fed through rollers 310 and 320 for joining with a flexible optical film. The rollers are preferably adjustable and spring loaded to accommodate a variety of thicknesses.

Figure 6:
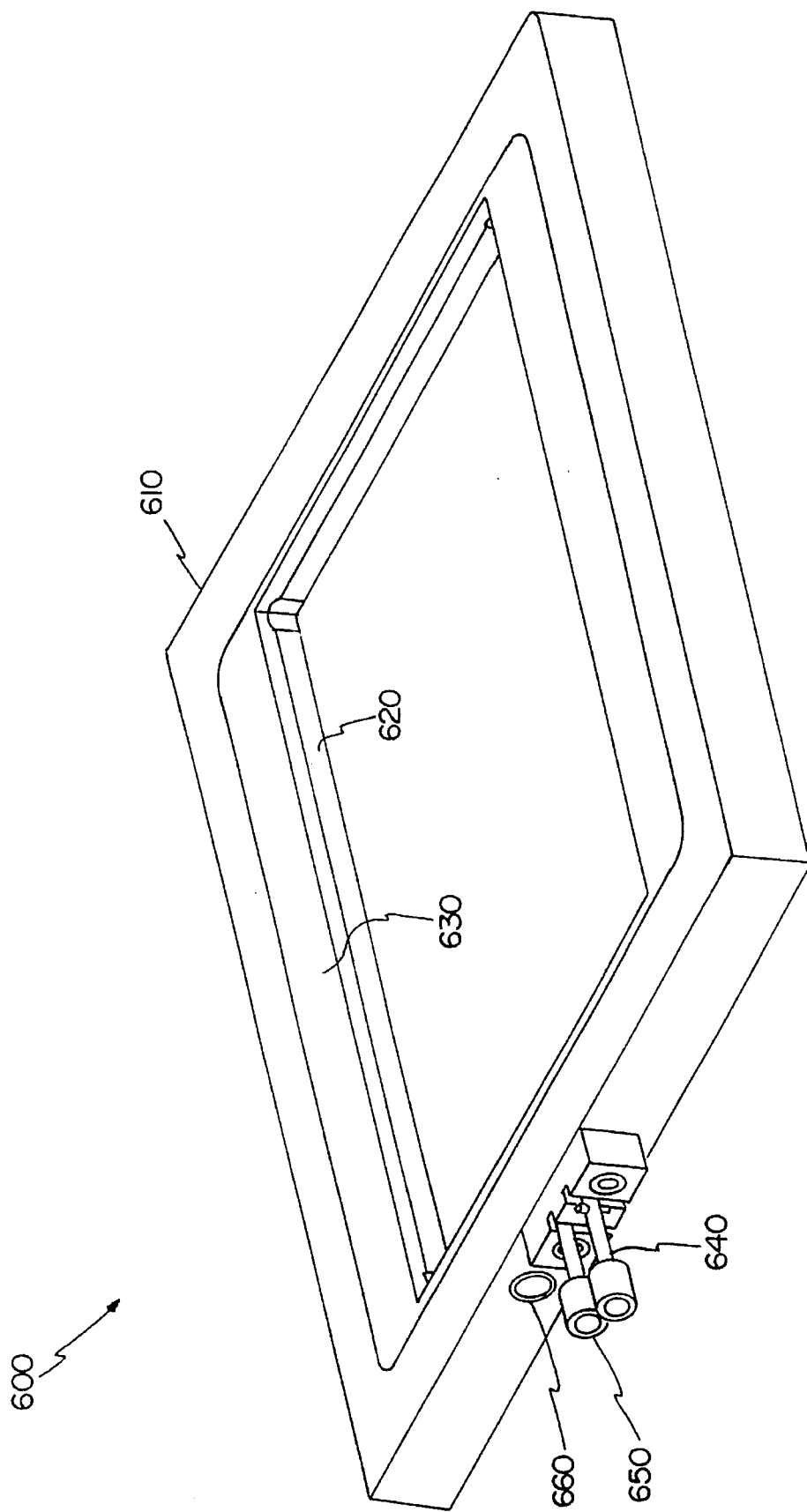
FIG. 6 is a perspective view of an assembly apparatus used in preferred embodiments of the present invention to create optical component assemblies.

FIG. 6 illustrates a new assembly apparatus used in accordance with preferred methods of the present invention. Apparatus 600 serves as an alignment and evacuated assembly apparatus, while at the same time, serving as an autoclave cavity. Apparatus 600 includes body 610, cavity 620, cavity 630, pin 640, pin 650 and aperture 660. Cavity 620 has dimensions which are only slightly larger than the dimensions of one or more rigid optical components or rigid optical component sub-assemblies intended to be held in the cavity during the assembly process. As discussed later with reference to FIG. 7, cavity 630 defines an enlarged area from which a flexible bladder extends or can be stretched. Although not shown in the preferred embodiment illustrated in FIG. 6, apparatus 600 can include additional cavities of varying sizes to hold rigid optical components and subassemblies of various sizes during the assembly process while achieving the necessary alignment tolerances.

Pins 640 and 650 each support a rigid optical component or optical component sub-assembly and keep the two or more rigid optical components or optical component sub-assemblies held in cavity 620 separated at a first end. Aperture 660 provides a passage through body 610 which opens into cavity 620. As will be discussed next in greater detail with reference to FIGS. 7 through 9, apparatus 600 is used to construct optical component assemblies having multiple rigid optical components (such as optical components 160 illustrated in FIGS. 1, 3 and 5) and/or multiple rigid optical component sub-assemblies (such as sub-assembly 500 illustrated in FIG. 5).

Figure 7:
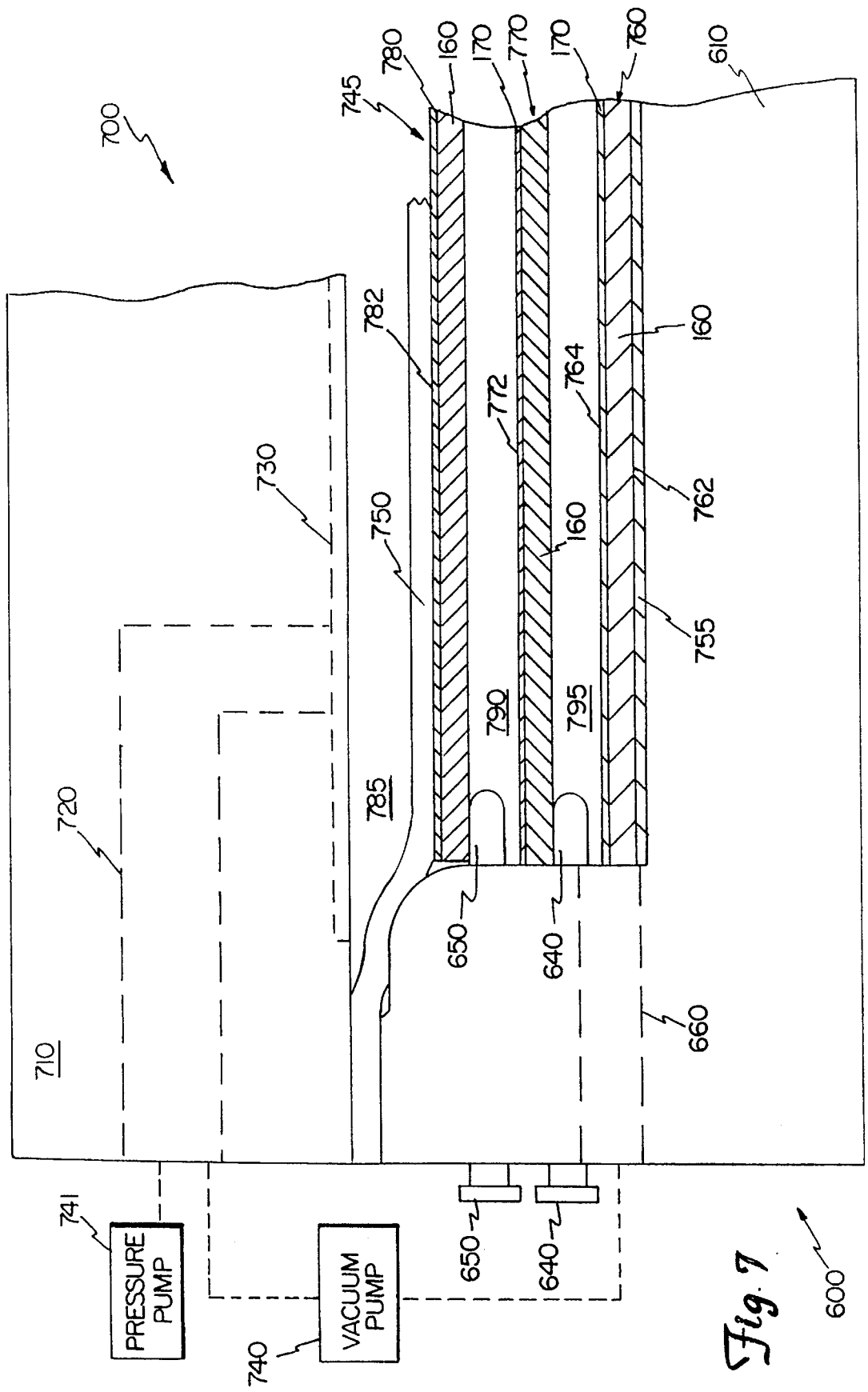
FIG. 7 is a diagrammatic side view with portions shown in section and portions broken away of an assembly apparatus used to create optical component assemblies and which includes the assembly apparatus shown in FIG. 6.
Figure 8:
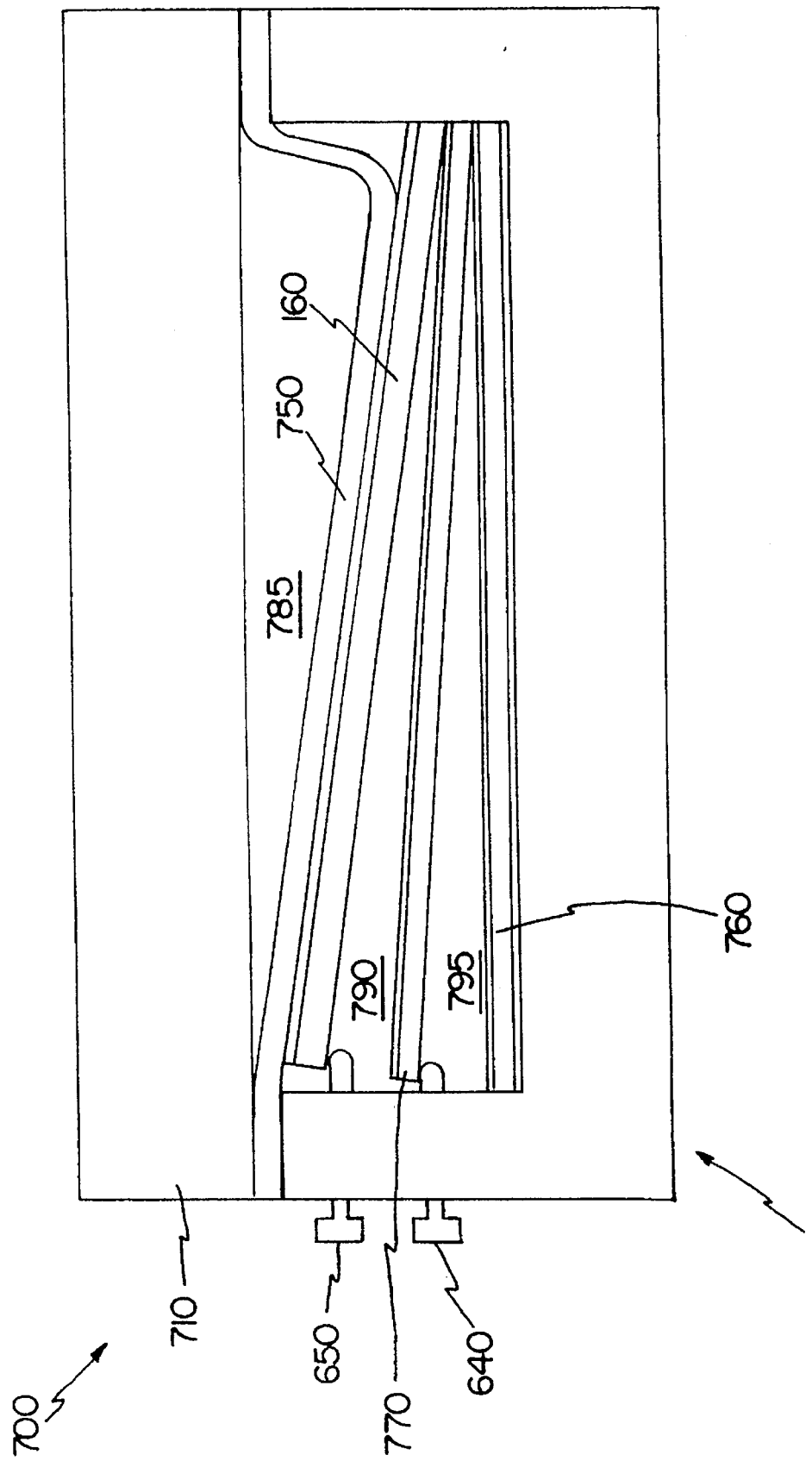
FIG. 8 is a diagrammatic side view of the assembly apparatus shown in FIG. 7 which further illustrates a preferred method of the present invention.
Figure 9:
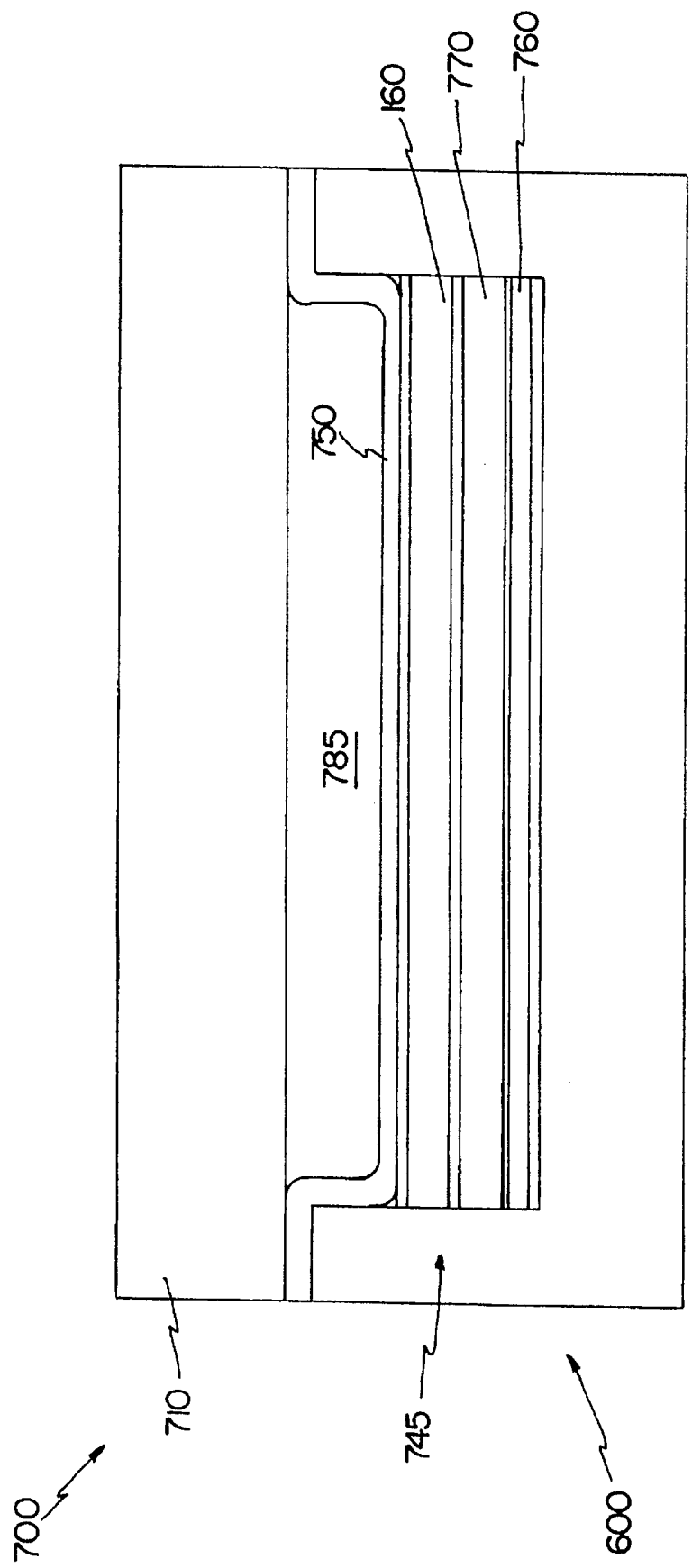
FIG. 9 is a diagrammatic side view of the assembly apparatus shown in FIGS. 7 and 8 which further illustrates a preferred method of the present invention.

FIGS. 7 through 9 illustrate an assembly apparatus and method of the present invention. The following description of apparatus 700 encompasses the manner in which optical component assemblies are created. The optical component assemblies can later be secured to LCD 110. Apparatus 700 includes apparatus 600, lid 710, vacuum pump 740 and pressure pump 741. Lid 710 includes aperture or channel 720 and air distribution cavity 730. Aperture 720 opens into air distribution cavity 730. FIG. 7 illustrates apparatus 600 having a single cavity in which multiple optical component sub-assemblies of the same size are placed to create an optical component assembly. However, as discussed above with reference to FIG. 6, it is clear that cavities having differing dimensions can be used to facilitate proper assembly and alignment of two rigid optical components or sub-assemblies having differing dimensions. Also, although FIGS. 8 and 9 do not show vacuum pump 740, pressure pump 741 and some of the other details of apparatus 700 illustrated in FIG. 7, these features remain present. They are omitted from FIGS. 8 and 9 to more clearly illustrate the invention.

Apparatus 700 is used to create optical component assembly 745 having multiple rigid optical components (i.e., components 160 shown in FIG. 1) or optical component sub-assemblies (i.e., sub-assembly 500 shown in FIG. 5). FIGS. 7 through 9 illustrate assembly 745 in different stages of construction. In the example illustrated in FIGS. 7 through 9, apparatus 700 is used to create assembly 745 having sub-assemblies 760 and 770 and having a single rigid optical component 160 at the top. Both of sub-assemblies 760 and 770 have a rigid optical component 160 pre-attached to a flexible optical component 170 in the manner discussed above with reference to FIGS. 2 through 5.

Apparatus 700 is used to create optical component assembly 745 as follows. First, one or more cushions 755 are placed at the bottom of the cavity of apparatus 600. Next, optical component sub-assembly 760 is placed in the cavity. Sub-assembly 760 has scratch proof protective film 762 covering the bottom of its rigid optical component 160. The protective film covering pressure sensitive adhesive 764 has at this point been removed.

Pin 640 is inserted through a corresponding aperture in body 610 so that it protrudes into the cavity of apparatus 600 above sub-assembly 760. Then, optical component sub-assembly 770 is placed into the cavity so that a first end rests upon pin 640, while a second end rests upon an end of optical component sub-assembly 760. This is best illustrated in FIG. 8. The protective film has been removed from sub-assembly 770 to expose pressure sensitive adhesive 772. Because pin 640 keeps sub-assemblies 760 and 770 separated at one end, chamber or volume 795 is formed between sub-assemblies 760 and 770.

Next, pin 650 is inserted through a corresponding aperture in body 610 so that it protrudes into the cavity of apparatus 600 above rigid optical component assembly 770. Then, single rigid optical component 160 having scratch proof protective film 782 is placed into the cavity such that a first end rests upon pin 650, while a second end rests upon the second end of sub-assembly 770. Pin 650 supports component 160, forming chamber or volume 790. This is best illustrated in FIG. 8.

Lid 710 is secured in place on top of apparatus 600 such that flexible silicone bladder 750 is positioned in cavity 630 (not shown if FIGS. 7 through 9) and on top of the uppermost optical component, in the present example, single rigid optical component 160. Lid 710 completely seals the cavity of apparatus 600 such that chamber or volume 785 is formed between lid 710 and bladder 750. Apparatus 700 is next placed into a heated press (not shown). The combination of the heated press and apparatus 700 forms the equivalent of an autoclave. Vacuum pump 740 is at this point used to evacuate air from aperture 720, and ultimately, from chamber 785. Next, vacuum pump 740 is used to evacuate air from aperture 660, and ultimately, from chambers 790 and 795. Air is evacuated from chamber 785 first in order to hold up bladder 750 so that excessive pressure is not exerted on assembly 770 or component 160 at their respective points of contact with one of pins 640 and 650.

After the air in chambers 785, 790 and 795 has been evacuated, pins 640 and 650 are pulled so that the previously supported ends of component 160 and assembly 770 collapse due to gravity upon assembly 760. This is best illustrated in FIG. 9. In preferred embodiments, pin 640 is pulled first, followed by the pulling of pin 650. Since the air has been evacuated from chambers 790 and 795, no air bubbles should exist, and intimate contact is made between the pressure sensitive adhesive layers and the glass of adjacent components or sub-assemblies.

Next, pressure pump 741 is turned on to pressurize now enlarged chamber 785 to 100 pounds per square inch (PSI). The pressurization of chamber 785 exerts a force on flexible bladder 750 which evenly applies a force which squeezes all of the components of assembly 745 together. Vacuum pump 740 is switched off and vented.

Air distribution cavity 730 of lid 710 provides more even evacuation and pressurization of cavity 785 during the process. Cavity 730 also holds bladder 750 off of the top optical components in assembly 745. Air distribution cavity 730 is an opening to aperture 720 containing a mesh or other structure which allows air to pass through to facilitate evenly distributed evacuation and pressurization of cavity 785. Without cavity 730 and its contained mesh structure, bladder 750 can be pulled into aperture 720 during evacuation. Also, without cavity 730, bladder 750 would be caused to apply uneven pressure to the optical component assembly or stack-up. Applying non-uniform pressure over the optical component stack-up can result in insufficient lamination or other defects such as stress fractures or bubbles in the adhesive. After autoclaving the stack-up at 80° C. and under 100 PSI for a minimum of one hour (fifteen minutes in the case of smaller LCDs) to uniformly stabilize the laminant or adhesive, assembly 745 is removed from apparatus 700.

Figure 10:
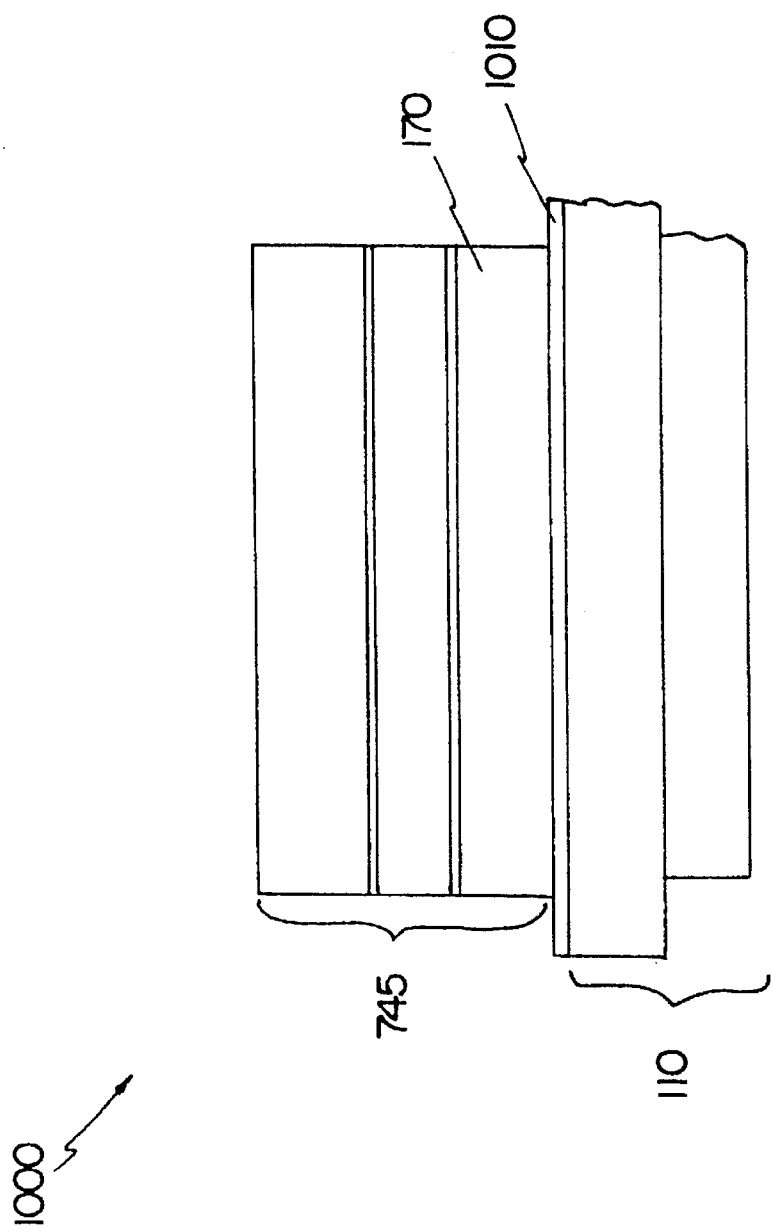
FIG. 10 is a side view of an LCD stack-up in which an optical component assembly of the present invention is attached to an LCD.

FIG. 10 illustrates LCD stack-up 1000 which includes optical component assembly 745 attached to the glass of one side of LCD 110 with layer 1010 of adhesive or other material capable of permanently or removably securing assembly 745 to LCD 110. Co-pending U.S. Patent Application file number 95CR032, which has been herein incorporated by reference, discloses a novel material and method of attaching optical component assemblies such as assembly 745 to an LCD.

The method of the present invention of producing optical component assemblies which can later be attached to an LCD is a considerable improvement over prior art methods of creating LCD stack-ups which require the application of one component at a time directly to the LCD itself or directly to the LCD stack-up. The roller apparatus illustrated in FIGS. 3 and 4 ensures complete coverage of rigid optical components with flexible film optical components. Misalignment and air bubbles between the flexible film and the rigid optical component are minimized. The apparatuses shown in FIGS. 6 through 9 ensure proper alignment between rigid optical components and/or rigid optical component sub-assemblies. Air bubbles are also eliminated because attachment is made in a vacuum. Securing the rigid components and sub-assemblies together under pressure and at high temperatures improves the adhesion and virtually eliminates cracking, delaminating and discoloration. Since it is undesirable to expose the LCD to high temperatures and pressures, prior art methods which apply each component directly to the LCD cannot benefit from the improved adhesion obtained by the method of the present invention.

While particular embodiments of the present invention have been shown and described, it should be clear that changes and modifications may be made to such embodiments without departing from the true scope and spirit of the invention. It is intended that the appended claims cover all such changes and modifications.

We claim:

1. A method of securing a first rigid optical component having a substantially planar surface to a second rigid optical component having a substantially planar surface to create an optical component assembly for use with a liquid crystal display, the method comprising:

placing the first rigid optical component into a cavity;

placing the second rigid optical component into the cavity such that the substantially planar surface of the first rigid optical component and the substantially planar surface of the second rigid optical component face one another, the substantially planar surface of at least one of the first and second rigid optical components including an adhesive material attached thereto such that the adhesive material is positioned between the substantially planar surfaces of the first and second rigid optical components, wherein the second rigid optical component is supported by a first support device such that a first end of the second rigid optical component is prevented from contacting a corresponding first end of the first rigid optical component, a first chamber being formed between the substantially planar surface of the second rigid optical component and the substantially planar surface of the first rigid optical component;

evacuating air from the first chamber;

removing the support of the first support device so that the first end of the second rigid optical component comes into contact with the first end of the first rigid optical component such that the substantially planar surface of the first rigid optical component and the substantially planar surface of the second rigid optical component are positioned parallel to one another with the adhesive material sandwiched therebetween; and applying a force to at least one of the first and second rigid optical components, the force being directed such that the substantially planar surface of one of the first and second rigid optical components is urged toward the substantially planar surface of the other of the first and second rigid optical components.

2. The method of claim 1 wherein applying the force includes applying a force to at least one of the first and second rigid optical components which is at least 50 pounds per square inch.

3. The method of claim 2 wherein applying the force includes applying a force to at least one of the first and second rigid optical components which is approximately 100 pounds per square inch.

4. The method of claim 1 and further comprising:

applying heat to the first and second rigid optical components for a period of time during which the force is being applied.

5. The method of claim 4 wherein the period of time is at least fifteen minutes in length.

6. The method of claim 1 wherein the cavity is a cavity of an apparatus, the apparatus having a lid, a second chamber being formed between the lid and a second surface of the second rigid optical component, the method further comprising:

evacuating air from the second chamber prior to evacuating air from the first chamber in order to minimize pressure applied to the second optical component while the second optical component is supported by the first support device.

7. The method of claim 6, wherein the apparatus further includes a flexible bladder positioned on the second surface of the second rigid optical component, the second chamber being formed between the lid and the flexible bladder.

8. The method of claim 7 wherein applying a force to at least one of the first and second rigid optical components comprises:

pressurizing the second chamber after the support of the first support device has been removed, wherein pressurizing the second chamber causes the flexible bladder to apply a force to the second rigid optical component which tends to urge the second rigid optical component toward the first rigid optical component.

9. The method of claim 1 wherein the adhesive material is a layer of pressure sensitive adhesive material, and wherein applying a force to the at least one of the first and second rigid optical components causes increased adhesion between the first and second rigid optical components.

10. The method of claim 1 wherein the first optical component is an optical component sub-assembly having a flexible film optical element attached to a rigid optical element.

11. The method of claim 10 wherein the flexible film optical element is attached to the rigid optical element by rollering a sheet of flexible optical film material onto the rigid optical element in an overlapping fashion, and subsequently trimming excess flexible film optical material so that the flexible film optical element has a same height and width as the rigid optical element.

* * * * *